United States Patent [19]
Matthews et al.

[11] 4,153,429
[45] May 8, 1979

[54] SELECTIVE ADSORPTION OF $NO_x$ FROM GAS STREAMS

[75] Inventors: William G. Matthews, Hartsdale, N.Y.; Herbert C. Shaw, Mobile, Ala.

[73] Assignee: Union Carbide Corporation, New York, N.Y.

[21] Appl. No.: 579,627

[22] Filed: May 21, 1975

[51] Int. Cl.² .............................................. B01D 53/02
[52] U.S. Cl. .......................................... 55/68; 55/75
[58] Field of Search ................................ 55/68, 74, 75

[56] References Cited

U.S. PATENT DOCUMENTS

| | | | |
|---|---|---|---|
| 2,578,674 | 12/1951 | Daniels et al. | 55/68 |
| 3,130,007 | 4/1964 | Breck | 55/75 |
| 3,689,212 | 9/1972 | Petit et al. | 55/75 |

Primary Examiner—Bernard Nozick
Attorney, Agent, or Firm—Richard G. Miller

[57] ABSTRACT

In the process for selectively adsorbing $NO_x$ from nitric acid plant acid absorber tower tail gas streams wherein the tailgas stream, comprising water vapor, oxygen, nitrogen and unreacted $NO_x$ is first dried by passage through a silica adsorbent mass and thereafter the $NO_x$ is selectively adsorbed in a zeolitic molecular sieve bed, the improvement which comprises utilizing as the molecular sieve adsorbent a zeolite Y composition having a high degree of ionic character coupled with a high degree of acid stability.

3 Claims, 1 Drawing Figure

U.S. Patent     May 8, 1979     4,153,429
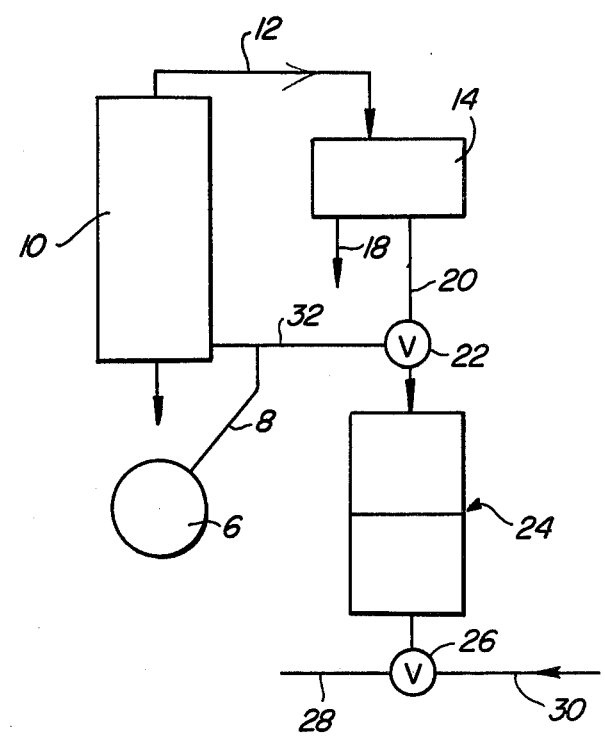

SELECTIVE ADSORPTION OF NO$_x$ FROM GAS STREAMS

This invention relates in general to a method for removing nitrogen oxides present in gas streams, even in low concentrations, and more particularly, to the recovery of nitrogen oxides from tail gas in nitric acid producing processes.

For the most part, nitric acid is currently produced on a commercial scale by the catalyzed oxidation of ammonia and the subsequent reaction of NO$_2$ or N$_2$O$_4$ with water. The initial reaction between oxygen and ammonia produces a mixture of water and nitrogen oxides principally as nitric oxide, i.e., NO. A secondary oxidation step further converts the nitric oxide to NO$_2$ and/or the dimer form of NO$_2$, namely dinitrogen tetraoxide, N$_2$O$_4$. The absorption of NO$_2$ and/or N$_2$O$_4$ in water spontaneously produces nitric acid in accordance with one or both of the equations:

$$3NO_2 + H_2O \rightarrow 2HNO_3 + NO \quad (1)$$

$$3N_2O_4 + 2H_2O \rightarrow 4HNO_3 + 2NO \quad (2)$$

Further oxidation of the NO produced by these reactions is carried out in the aqueous absorption zone and the NO$_2$ thus formed is also reacted with water to produce additional but successively ever diminishing quantities of NO by the same mechanism. The waste or tail gas from the aqueous absorber contains normally about 0.15 to 0.3 mole percent unabsorbed oxides of nitrogen (commonly expressed as NO$_x$), principally NO and NO$_2$. Heretofore, and to some extent at present, it was the practice to vent this tail gas into the atmosphere, thereby causing substantial atmospheric pollution. It was not uncommon that such vented tail gases contained as much as 4000 to 5000 ppm (volume) NO$_x$ — an amount many times greater than the 200 ppm currently required for air pollution control.

There have been several reported prior attempts to recover NO$_x$ from tail gas either to prevent air pollution or to improve the efficiency of the nitric acid process, or both. Many of these attempts have involved the use of solid absorbents. A particularly effective prior proposed process is disclosed in U.S. application Ser. No. 545,833, filed Jan. 31, 1975 by R. D. Taylor, and incorporated herein by reference. That process comprises contacting a gas mixture comprising water vapor, nitrogen, and at least one of the gases NO and NO$_2$, said gas stream also containing oxygen when NO$_2$ is absent therefrom, with an adsorbent bed of activated (dehydrated) silica gel sufficient to adsorb the water vapor therefrom, contacting the gas mixture constituents unadsorbed by said silica gel with a zeolite, preferably of the cage type, having a pore size large enough to admit NO$_2$, i.e., at least about 4 angstroms whereby NO is catalytically oxidized to NO$_2$ and NO$_2$ is adsorbed in said zeolite, and thereafter desorbing the NO$_2$ from the zeolite adsorbent.

It is the object of the present invention to improve the aforesaid process by providing a zeolitic molecular sieve adsorbent composition which has a high capacity for NO$_2$ adsorption and exceptional durability under actual commercial usage conditions.

It has been found that the initial capacity zeolite adsorbents have for NO$_2$ adsorption is related to the ionic character of the zeolite. Apparently the intercrystalline environment of cationized zeolites, i.e. the polar surroundings and comparatively intense fields of force, is suitable for the formation of strong adsorption forces between the zeolite and NO$_x$ molecules. In fixed bed adsorption processes this strong adsorptive affinity contributes to sharp mass transfer boundaries and hence permits the use of more of the ultimate bed capacity for NO$_2$ prior to break-through. It is also found however that NO$_x$ species adsorbed on zeolites are highly reactive and undergo substantial disproportionation and reaction with residual water ordinarily present unless the zeolite has been subjected to the most rigorous activation procedures. The resulting nitric and nitrous acids tend to further react with metal cations of the zeolite to form the corresponding salts. Since the salts are not removed by conventional desorption procedures, they accumulate and seriously decrease the capacity of the zeolite for further adsorption of NO$_x$ molecules. The salt-forming reaction also leads to degradation of the crystal structure of zeolites having relatively low SiO$_2$/Al$_2$O$_3$ molar ratios.

It has been proposed that to avoid the salt-clogging problem and to insure stability against acid attack, highly siliceous zeolites such as mordenite should be used, and/or the metal cation population should be decreased by decationization methods. Stable decationized forms of zeolites such as zeolite Y, for example, are attained only after the most rigorous removal of zeolitic cations coupled with high temperature calcination. Such "double decationized" stable zeolite forms are disclosed in U.S. Pat. No. 3,293,192 issued Dec. 20, 1966 to P. K. Maher et al. Although zeolites treated in this manner are in fact fairly effective adsorbents for NO$_x$, the required stability is necessarily imparted, by the nature of the preparative process, to an excessive degree and at the expense of ionic character of the zeolite product. Thus the adsorptive properties of the zeolite are less than the potentially achieved levels.

In accordance with the present process we have attained a unique combination of stability and adsorption capacity in a zeolite Y type of adsorbent for the adsorption of NO$_x$. This zeolite possesses the essential crystal structure of zeolite Y as set forth in U.S. Pat. No. 3,130,007, issued Apr. 21, 1964 to D. W. Breck. In addition it possesses a SiO$_2$/Al$_2$O$_3$ molar ratio of from 4.5 to 5.5, preferably greater than 4.8, contains from 8 to 30 equivalent percent metal cations in association with AlO$_4^-$ tetrahedra of the zeolite framework, at least 8 equivalent percent being preferably sodium cations, and has a unit cell dimension, $a_o$, of from greater than 24.55 to 24.63 Angstrom units. The species of metal cations present in the zeolite is not a critical factor and can be, in addition to sodium which is present in the zeolite as a result of the synthesis process, any metal which can be introduced into the zeolite as substitutes for the original cations by conventional procedures and can withstand calcination at temperatures up to about 800° C. Preferably any cations in addition to 8 equivalent percent sodium cations are bivalent or trivalent metal cations such as rare earth, magnesium, manganese, strontium and calcium or mixtures thereof.

Since a composition consisting essentially of zeolite crystals only is difficult to compact into convenient pellet or tablet form for use in an adsorption bed, it is advantageous that the zeolite be intimately admixed with from 10 to 30 weight percent, anhydrous basis, of an inorganic oxide binder material such as alumina (böehmite), silica gel, magnesia, strontia, SiO$_2$—Al$_2$O$_3$, and clays such as bentonite. The anhydrous basis is intended to mean the weight of the zeolite composite after calcination at 1000° C.

The preparation of the zeolite-containing composition defined above is easily accomplished using apparatus and techniques well known in the art. Reduction of the original, as-synthesized, alkali metal cations to the range of 8 to 30 equivalent percent is done by ion exchange using a hot aqueous medium containing an ammonium salt such as ammonium chloride. The use of a series of ion exchange steps using fresh exchange media facilitates removal of sodium to the range of 8 to 30 equivalent percent sodium cations. Other metal cations can, at the same time or thereafter, be introduced by ion exchange if desired up to the maximum permissible limit of 30 equivalent percent total metal cation content. Reduction of the unit cell size, which is about 24.68 for the ion-exchanged form of the zeolite, to the range of greater than 24.55 to 24.63 is accomplished by calcining, most preferably in the presence of added steam, at temperatures of from 400° C. to 800° C. for a period of time sufficient to cause the requisite amount of cell shrinkage. It is to be understood that as the temperature increases within the permissible range the required time will be shortened. The precise chemical composition of the zeolite starting material will have a small effect on the temperature and time conditions, but routine sampling of the product and measurement of the unit cell dimension by standard well known analytical techniques is easily resorted to for the satisfactory accomplishment of the cell-shrinking procedure.

Although the zeolite alone can be subjected to the cell-shrinking calcination, it is found that the presence of the inorganic binder-diluent materials specified hereinbefore does not interfere with the calcination procedure and hence is advantageously combined with the zeolite before the calcination takes place. After calcination and cooling, which is advantageously done in the essential absence of ammonia evolved during the calcination due to the deomposition of $NH_4+$ cations, the water content of the zeolite measured as the loss on ignition (LOI) at 1000° C. is usually in the range of about 1.5 to 3.0 weight-%. A preparative method suitably employed is described in the following example:

EXAMPLE I

To a mixer-muller was charged (a) 40 pounds (LOI at 1000° C.=19.3%) of an 85 equivalent percent ammonium exchanged sodium zeolite Y having a $SiO_2/Al_2O_3$ molar ratio of 4.8; (b) 10 pounds alumina (LOI at 1000° C.=19.7%) which had been admixed with 1.5 pounds nitric acid and 15 pounds water to effect alumina peptization; (c) 0.5 pounds quebracho as an extrusion agent and (d) 0.25 pounds dextrose as a porosity aid. The mass was mulled for 15 minutes and then 23 pounds of water were added and the mulling continued for 45 additional minutes. The mull cake was then extruded as 1/16 inch diameter pellets having length to diameter ratios of from about 2.0 to 2.5. The pellets were dried to an LOI at 1000° C. of 18–20 weight-%. The pellets were thereafter fed through a rotary kiln heated such that the temperature of the pellets was raised over a period of about 45 minutes to 600° C. and then entered the hottest zone of the kiln operated at 625° to 630° C. The residence time of the pellets in this hot zone was 15 minutes. The kiln was sparged with an atmosphere of air containing from 50 to 60 percent steam except at the discharge end which was sparged with dry air to protect the cooling pellets from contact with water vapor and evolved ammonia. The pellets were cooled to below 300° C. in a period of 10 minutes. The zeolite had an $a_0$ of 24.62 Å.

It will be understood by those skilled in the art that whereas the gas mixtures of primary interest in the present invention are tail gases or stack gases from nitric acid plants, the process is equally suitable for removing NO and/or $NO_2$ from any gas stream which contains same in combination with water vapor and any other gases which are not destructive of the adsorbent materials, especially the zeolitic molecular sieves. Since NO is not adsorbed by zeolites, stoichiometric quantities of oxygen must be present with respect to the quantity of NO which is to be removed. Illustrative of other gaseous substances which can be a part of the gas mixture being treated are argon, helium, neon and carbon dioxide. A representative tail gas stream from an ammonia oxidation type $HNO_3$ process contains in parts by volume,

| | |
|---|---|
| oxygen | 3.0 |
| water | 0.6 |
| nitrogen oxides | 0.3 (NO + $NO_2$) |
| nitrogen | 96.1 |

It is well known, however, that these tail gas streams are subject to variations in composition even during continuous operation of the process. These variations are due in large part to changes in the relative rate at which excess air for oxidation of the nitric oxide is supplied and the necessary alterations in the proportions of air and ammonia supplied to the catalytic reactor to prevent catalyst overheating. As a result, the oxygen volume percent can occasionally increase from about 0.2 to 20. Even variations of this magnitude are compatible with the recovery process of this invention.

The silica gel employed as the desiccant in the process can be any of the numerous commercially available adsorbent grade materials such as are obtained by the suitable coagulation of hydrated silica obtained by destabilizing an aqueous silicate solution. The silica gel is, of course, activated or to a substantial degree dehydrated at the start-up of the $NO_x$ recovery process.

The process conditions of temperature, pressure, flow rates and contact times are not narrowly critical factors in the present process. Similarly, whereas the overall invention can most readily be illustrated using a fixed adsorbent bed system and in situ regeneration, the process is readily adapted to the use of moving beds, fluidized beds, external regeneration and the numerous other system modifications heretofore proposed for adsorption systems generally.

The process for using the zeolite compositions of the present invention to selectively adsorb $NO_x$ is exemplified by the following description in conjunction with the drawing.

The drawing constitutes a schematic flow diagram of an acid absorption tower of a nitric acid plant and the system for treating the tail gas effluent therefrom.

The process scheme shown in the drawing illustrates the use of a dual bed containing a first section containing silica gel desiccant and a second section containing a molecular sieve $NO_x$ adsorbent composition of the present invention. The dual bed contains 2100 pounds silica gel and 5100 pounds of the composite zeolite composition prepared in Example I above. The tail gas being treated is the effluent from nitric acid absorber tower 10 fed thereto from catalytic converter 6 through line 8. This water-saturated gas stream is at a temperature of 100° F. and at a pressure of 82 psig as it is passed through line 12 to cooler 14 wherein the temperature of the gas stream is reduced to 50° F. with the consequent condenstion of water vapor and the formation of nitric acid which are removed from the system through line 18. The cooled and partially dehydrated feed gas thus produced is saturated with water vapor, contains 3 volume percent oxygen and contains 1833 ppm $NO_x$ by volume.

The residue of the gas stream is nitrogen. This gas stream at the rate of 5500 scf per minute is passed through line 20 and valve 22 to dual adsorbent bed 24 containing in the first portion thereof 2100 pounds of silica gel. The second portion of the bed contains 5100 pounds of zeolite composition prepared in Example I above. Substantially all of the water is removed from the gas stream by the silica gel and NO is oxidized to $NO_2$ and $NO_2$ is adsorbed on the molecular sieve as the gas stream passes through the bed 24. The effluent from bed 24, principally nitrogen and oxygen, contains 18.4 ppm $NO_x$. This effluent is passed through valve 26 and line 28. To desorb bed 24 at the end of its adsorption stroke, 950 scfm of dry air at 550° C. is passed through line 30 and valve 26 counter-currently through the bed. The purge gas and desorbed $NO_x$ passes through valve 22, and line 32 to absorber tower 10 to be reprocessed. It was found that after 351 cycles of the above described operation, the effluent from the bed 24 remained essentially unchanged with respect to $NO_x$ content.

What is claimed is:

1. Process for selectively adsorbing gaseous oxides of nitrogen from a gas stream which comprises in addition to said oxides of nitrogen, water vapor, oxygen and nitrogen which comprises passing said gas stream through an adsorbent bed of activated silica gel to adsorb water therefrom and thereafter contacting the gas stream constituents unadsorbed by said silica gel with a zeolite adsorbent comprising zeolite Y ion exchanged with non-metallic ions consisting essentially of $NH_4+$ or $H+$ or mixtures thereof having a $SiO_2/Al_2O_3$ molar ratio of from 4.5 to 5.5, containing from 8 to 30 equivalent percent metal cations in association with $AlO_4^-$ tetrahedra of the zeolite framework, at least 8 equivalent percent of said metal cations being sodium cations, said zeolite having been calcined at a temperature of from 400° C. to 800° C. to reduce the unit cell size and to obtain a unit cell size, $a_o$, to a value of from greater than 24.55 to 24.63 Angstrom units, whereby oxides of nitrogen are adsorbed and separated from the nitrogen and oxygen present.

2. Process according to claim 1 wherein the $SiO_2/Al_2O_3$ molar ratio of the zeolite adsorbent is from 4.8 to 5.5.

3. Process according to claim 1 wherein the gas stream being treated is the tail gas stream from a nitric acid plant absorber tower.

* * * * *